United States Patent Office 3,247,433
Patented Apr. 19, 1966

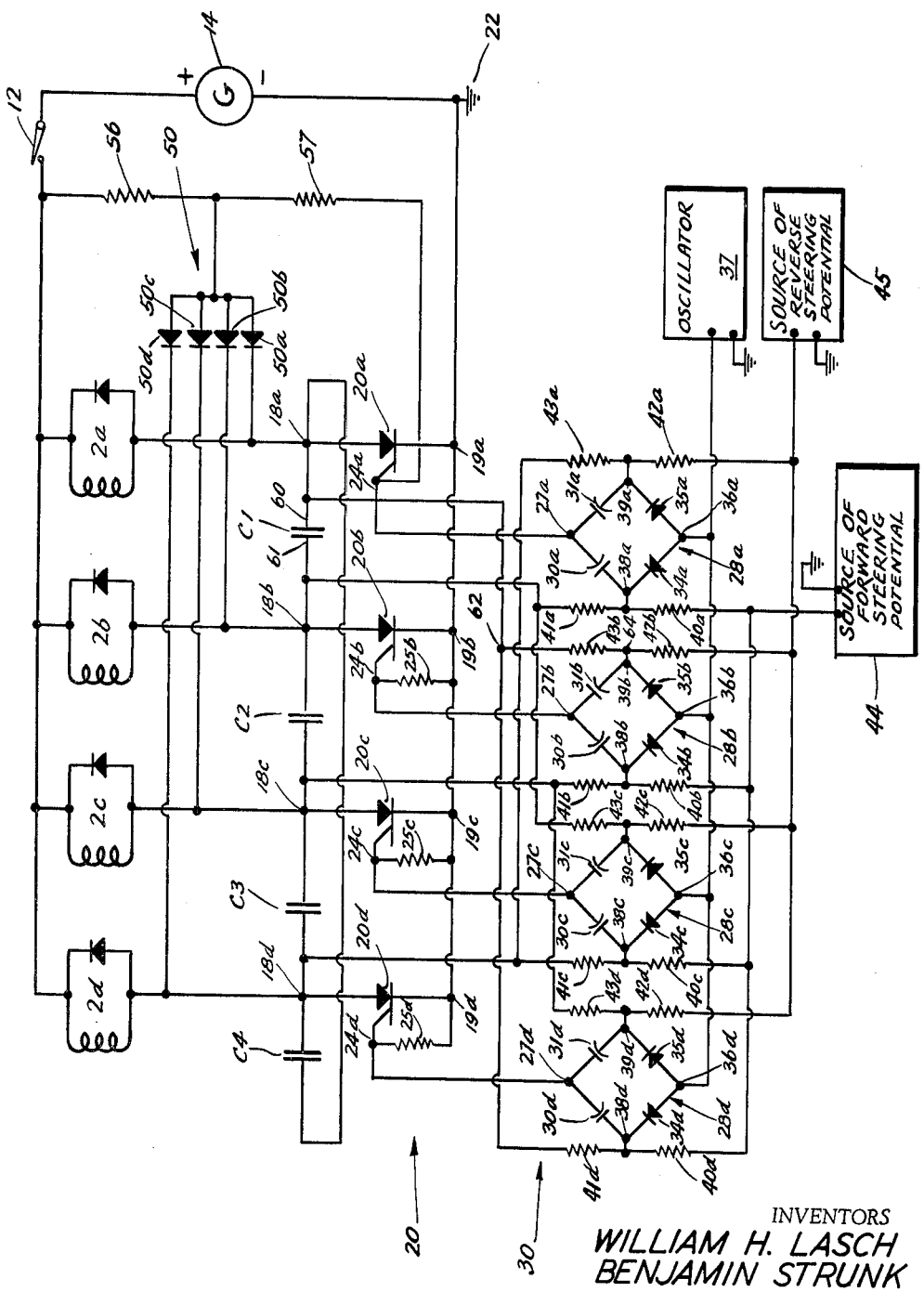
INVENTORS
WILLIAM H. LASCH
BENJAMIN STRUNK
BY Roland Plottel
ATTORNEY

3,247,433
REVERSIBLE SILICON CONTROLLED RECTIFIER RING COUNTER FOR STEPPER MOTOR DRIVE
William H. Lasch, Hasbrouck Heights, and Benjamin Strunk, Clifton, N.J., assignors to The Bendix Corporation, Teterboro, N.J., a corporation of Delaware
Filed Dec. 12, 1962, Ser. No. 244,218
10 Claims. (Cl. 318—138)

The invention relates generally to stepper motor control circuits and more particularly to reversible silicon controlled rectifier ring counters especially adapted for driving stepper motors.

An object of the invention is to provide a novel reversible ring counter using silicon controlled rectifiers.

Another object of the invention is to provide a novel reversible ring counter having a novel gating circuit which controls the direction of the counter.

Still another object of the invention is to provide a novel control circuit for controlling the direction of rotation of a stepper motor and including a reversible ring counter using silicon controlled rectifiers and diode gating circuits.

Another object of the invention is to provide a novel stepper motor control circuit having a novel starter circuit for automatically starting the motor from a power supply having a slow rise time.

Another object of the invention is to provide a novel stepper motor control circuit having a novel starter circuit for automatically restarting the motor after a momentary power interruption.

Another object of the invention is to provide a novel stepper motor control circuit with low power dissipation.

Another object of the invention is to provide a novel stepper motor control circuit which functions in response to digital control signals.

Another object of the invention is to provide a novel ring counter using silicon controlled rectifiers and which has fewer components than were required in previously developed ring counters.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

In the drawing:

The single figure is a diagram of a control circuit constructed in accordance with the invention shown driving a stepper motor.

Referring to the drawing, a stepper motor is shown having four windings, $2a$, $2b$, $2c$, and $2d$. The windings are connected to a control circuit having a silicon controlled rectifier ring counter 20, a gating circuit 30, and a starting circuit 50. The windings $2a$, $2b$, $2c$, and $2d$ must be energized one at a time for the motor to rotate in steps; and when energized in the sequence $2a$, $2b$, $2c$, $2d$, etc. the motor rotates in one direction; and when energized in the sequence $2a$, $2d$, $2c$, $2b$, $2a$, etc. the motor rotates in the opposite direction.

One terminal of each motor winding $2a$, $2b$, $2c$, and $2d$ is connected through a switch 12 to a source of potential or electrical energy such as a generator 14, which may have a slow rise time, and be subject to intermittent power failures. The other terminals of windings $2a$, $2b$, $2c$, and $2d$ are connected respectively to anodes $18a$, $18b$, $18c$, and $18d$ of silicon controlled rectifiers $20a$, $20b$, $20c$, and $20d$.

The anodes of the silicon controlled rectifiers are connected to the anodes of the adjacent silicon controlled rectifiers through capacitors C1, C2, C3, and C4 as follows: capacitor C1 connects anode $18a$ to anode $18b$, capacitor C2 connects anode $18b$ to anode $18c$, capacitor C3 connects anode $18c$ to anode $18d$, and capacitor C4 connects anode $18d$ to anode $18a$. Each silicon controlled rectifier $20a$, $20b$, $20c$, and $20d$ has a cathode $19a$, $19b$, $19c$, and $19d$ respectively, which are connected to a ground potential 22.

Rectifier $20a$ has a control terminal $24a$ which renders rectifier $20a$ conducting, from anode $18a$ to cathode $19a$, when the control terminal $24a$ is momentarily at a higher potential than the cathode terminal $19a$. Rectifiers $20b$, $20c$, and $20d$ have control terminals $24b$, $24c$, and $24d$ respectively, and operate in a fashion identical to rectifier $20a$. The control terminals $24b$, $24c$, and $24d$ of the control rectifiers $20b$, $20c$, and $20d$ are connected through resistors $25b$, $25c$, and $25d$ respectively to ground potential 22.

The control terminals $24a$, $24b$, $24c$, and $24d$ are connected respectively to terminals $27a$, $27b$, $27c$, and $27d$ of gates $28a$, $28b$, $28c$, and $28d$. Each gate $28a$, $28b$, $28c$, and $28d$ has a bridge configuration with a pair of capacitors $30a$ and $31a$, $30b$ and $31b$, $30c$ and $31c$, and $30d$ and $31d$ on either side of terminal $27a$, $27b$, $27c$, and $27d$, respectively. The remaining two legs have a pair of diodes $34a$ and $35a$, $34b$ and $35b$, $34c$ and $35c$, and $34d$ and $35d$. Terminals $36a$, $36b$, $36c$, and $36d$ opposite terminals $27a$, $27b$, $27c$, and $27d$ respectively, of gates $28a$, $28b$, $28c$, and $28d$ are connected to an oscillator 37 to receive a pulse train. The remaining pair of terminals in each bridge $28a$, $28b$, $28c$, and $28d$, namely terminals $38a$ and $39a$, $38b$ and $39b$, $38c$ and $39c$, and $38d$ and $39d$ respectively, are connected respectively to a junction of a pair of forward steering resistors and reverse steering resistors, viz.—terminal $38a$ is connected to junction of forward steering resistors $40a$ and $41a$, terminal $38b$ is connected to a junction of forward steering resistors $40b$ and $41b$, terminal $38c$ is connected to a junction of forward steering resistors $40c$ and $41c$, and terminal $38d$ is connected to a junction of forward steering resistors $40d$ and $41d$; and terminal $39a$ is connected to a junction of a pair of reverse steering resistors $42a$ and $43a$, terminal $39b$ is connected to a junction of a pair of reverse steering resistors $42b$ and $43b$, terminal $39c$ is connected to a junction of a pair of reverse steering resistors $42c$ and $43c$, and terminal $39d$ is connected to a junction of a pair of reverse steering resistors $42d$ and $43d$. Resistors $40a$, $40b$, $40c$, and $40d$ are connected to a source of forward steering potential 44, and resistors $42a$, $42b$, $42c$, and $42d$ are connected to a source of reverse steering potential 45. The sources 44 and 45 provide a low or high binary level signal, for example, 0 volts or +8 volts, and the outputs are normally both high. When the potential from forward source 44 is high and from source 45 is low, ring counter 20 is caused to count in the forward direction, namely, from $a$ to $b$ to $c$ to $d$. When the potential from reverse steering source 45 is high and potential from source 44 is low, the counter 20 counts in the opposite direction.

The forward counting resistors are connected to the reverse counting resistors in the next to adjacent gating circuit. Thus, resistor 41a is connected to resistor 43c and resistor 43a is connected to resistor 41c. Likewise, resistor 41b is connected to resistor 43b and resistor 43b is connected to resistor 41d.

Each reverse counting resistor 43a, 43b, 43c, and 43d is connected to the anode of the silicon controlled rectifier associated with the previous gate. Thus, resistor 43b is connected to anode 18a, resistor 43c is connected to anode 18b, resistor 43d is connected to anode 18c, and resistor 43a is connected to anode 18d.

The control circuit is initially turned on by a start circuit 50 having four diodes 50a, 50b, 50c, and 50d that are connected respectively to anodes 18a, 18b, 18c, and 18d. A first resistor 56 connects source 14, through switch 12, to the anodes of diodes 50a, 50b, 50c, and 50d. First resistor 56 is connected in series with a second resistor 57 which connects source 14 to control terminal 24a of silicon controlled rectifier 20a.

It will be seen then that the negative terminal of the generator 14 is connected to the cathode terminal 19a while the positive terminal of the generator 14 is connected through resistors 56 and 57 to the control terminal 24a and at the junction of resistors 56 and 57 through the start circuit 50 to the anode terminal 18a.

The circuit now having been described, its operation may be readily traced. When power is initially applied by closing switch 12, none of the silicon controlled rectifiers 20a, 20b, 20c, and 20d are conducting and anodes 18a, 18b, 18c, and 18d are at the potential of source 14. A positive potential passes through resistors 56 and 57 to control terminal 24a turning on silicon controlled rectifier 20a.

It should be noted that control terminal 24a is resistively connected to source 14 and thus, upon the application of power, rectifier 20a is rendered conducting only when a potential from the source reaches a predetermined level sufficient to turn on rectifier 20a. The initial turning-on of rectifier 20a (that starts up the entire ring counter 20) is thus a function of amplitude only and is independent of the rise time of source 14. It is important to also notice that in case of power interruption, the start circuit 50 will function in an identical manner and upon restoration of power, the start circuit turns on silicon controlled rectifier 20a. As rectifier 20a conducts, winding 2a is energized, anode 18a of rectifier 20a approaches ground potential, and diode 50a is forward biased to clamp the junction point of resistors 56 and 57 to the anode potential.

Assuming that the stepper motor is to be driven in the forward direction (a to b to c to d direction) a high signal is applied from source 44 to resistors 40a, 40b, 40c, and 40d and a low signal of zero potential is applied to resistors 42a, 42b, 42c, and 42d.

One capacitor plate 60 of capacitor C1 is a little bit above zero potential due to drop across the conducting silicon controlled rectifier 20a. The potential at the other plate 61 of capacitor C1 is equal to the full source voltage. A point 62 at the end of resistor 43b is at the same potential as plate 60 of capacitor C; and a point 64 at the junction of resistors 42b and 43b is close to zero volt.

Meanwhile, a pulse of, for example, 6 volts and two microseconds rise time is continuously applied to terminals 36a, 36b, 36c, and 36d from oscillator 37. However, gate 28b, because of low voltage at 64, is the only gate which will allow the 6 volts to pass. These 6 volts take the low impedance path through diode 35b and capacitor 31b to terminal 24b to render silicon controlled rectifier 20b conducting. As silicon controlled rectifier 20b goes conducting, the potential at its anode 18b drops to almost zero volts and causes capacitor C1 to momentarily reduce the voltage at anode 18a of silicon controlled rectifier 20a, to below zero, turning off silicon control rectifier 20a. Thus, one silicon controlled rectifier prepares the appropriate gating circuit for operation to the exclusion of the other three and the next silicon controlled rectifier, when fired, prepares the next gate for operation and shuts off the previous silicon controlled rectifier. The operation is continuous and sequential. The direction of rotation of the ring counter which determines the direction of rotation of the motor is controlled by a low signal applied to resistors 40a, 40b, 40c, and 40d for forward rotation, or to resistors 42a, 42b, 42c, and 42d for reverse rotation.

In summary, there has been shown a control circuit for driving a stepper motor with digital signals, namely pulses from oscillator 37 and binary level signal from the sources 44 and 45. The circuit has an automatic turn-on provision start circuit 50 that starts the circuit upon application of power, including power from a source having a slow rise time. The start circuit is also capable of automatically turning on the circuit after a power interruption. The control circuit includes gate circuits which provide a rapid all-electronic switching which is efficient and durable.

There are many different values of circuit parameters for which the circuit shown in the figure will function satisfactorily. Since the circuit parameters may vary according to the design for any particular application, the following circuit parameters are included for the circuit of the figure by way of example. Stepper Motor of Type No. X-1757094 of The Bendix Corporation. (This motor requires eight pulses per revolution, therefore, eight silicon controlled rectifiers, eight gates, etc. are required.)

Silicon controlled rectifiers 20 of a type 2N1595
Capacitors C1, C2, C3 and C4: 0.5μf.
Resistors 25: 3K
Capacitors 30 and 31: .01μf.
Diodes 34, 35, and 50 of a type 1N659
Resistors 40, 41, 42, and 43: 100K
Resistor 56: 1K
Resistor 57: 1.5K
Source 14 +28 volts D.C.

The circuit of the invention has been shown with four control channels bearing the postscripts a, b, c, and d, driving a stepper motor having four windings 20a, 20b, 20c, and 20d. It should be understood that the circuit of the invention may be used to drive a stepper motor having any number of windings, such as six or eight as in common use, but is not limited to these numbers. The invention may also be used to drive any ring type device such as, for example, marquee lights or a staggered light pattern for traffic control.

The circuit of the invention may be also thought of as an amplifier where a low input power, namely, the power from oscillator 37 and from sources 44 and 45, controls sequential application of large amounts of power to several utilization devices, shown here as the stepper motor windings 2a through 2d.

Althought but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. The combination comprising a silicon controlled rectifier having an anode, a cathode and a control terminal, a source of electrical energy having positive and negative terminals, conductor means for connecting the negative terminal of the source of electrical energy to the cathode of the silicon controlled rectifier, a pair of resistors for connecting the positive terminal of the source of electrical energy to the controlled terminal of the silicon control rectifier, diode means for connecting a junction of the two resistors to the anode of said silicon controlled rectifier, and control means for said source of electrical energy whereby upon application of a potential from said source to said silicon controlled rectifier through said pair of resistors said silicon controlled rectifier may be thereupon rendered in a conducting state.

2. A circuit for operating in a forward or reverse direction a stepper motor having a plurality of motor windings, comprising a source of potential connected to each of the motor windings, a silicon controlled rectifier connected from anode to cathode between each winding and the source and having a control terminal, capacitive means connecting the anodes of the silicon controlled rectifiers, gating means having bridge configurations and each gating means having diodes in two adjacent legs and capacitors in two adjacent legs, each gating means being connected at a junction of the two capacitors to the control terminal of one of the silicon controlled rectifiers and being resistively connected at junctions of the diodes with the capacitors to the anodes of the forwardly and reversely sequentially adjacent silicon controlled rectifiers, a pulse source connected to the junction of the two diodes in each gating means for applying pulses thereto, means for resistively connecting forward and reverse steering sources to the junctions of the diodes with the capacitors in each gating means to back bias the diodes and block the pulses from the pulse source from passing to all the rectifier control terminals except the next in sequence to operate the stepper motor in a forward or reverse direction determined by energization of the gating means by the forward or reverse steering source.

3. A circuit for sequentially energizing from a power source in forward or reverse order a plurality of utilization devices, comprising a silicon controlled rectifier connected from anode to cathode between each device and the power source and having a control terminal, diode gating means connected to the control terminals of the silicon controlled rectifiers for sequentially applying energizing signals there to render one of the silicon controlled rectifiers conducting, capacitors connecting the anodes of the silicon controlled rectifiers, and rendering a conducting silicon controlled rectifier nonconducting upon the sequentially adjacent silicon controlled rectifier being rendered conducting by the energizing signal, and means for selectively connecting forward and reverse steering sources to the gating means to determine the order of energizing the devices.

4. The circuit as defined in claim 3 including a starting circuit having a pair of resistors for connecting the power source to the control terminal of one of the silicon controlled rectifiers, and diodes connecting the junction of the pair of resistors to the anodes of the silicon controlled rectifiers to render one silicon controlled rectifier conducting when energized by the power source.

5. A circuit of the kind defined in claim 3 in which each diode gating means comprises a pair of capacitors and a pair of diodes connected in bridge configuration and receiving pulses at a junction of the two diodes and transmitting the pulses from an opposite terminal to the control terminal of one of the silicon controlled rectifiers, first and second pairs of divider resistors connected to the anode of a forwardly sequentially adjacent silicon controlled rectifier and to the anode of a reversely sequentially adjacent silicon controlled rectifier, respectively, the resistors at their junctions being connected to two remaining terminals of the bridge, one pair of divider resistors being energized for controlling sequential conductance of the silicon controlled rectifiers in forward order and the other pair of divider resistors being energized for controlling sequential conductance of the silicon controlled rectifiers in reverse order.

6. A circuit for sequentially energizing a number of utilization devices from a potential source, comprising a silicon controlled rectifier having a control terminal and having an anode and a cathode connected in series with each utilization device, capacitors connecting the anodes of the silicon controlled rectifiers to one another to permit conduction by only one silicon controlled rectifier at a time, gating means connected to the silicon controlled rectifiers for sequentially applying energizing signals thereto, a starting circuit having a pair of resistors for connecting the potential source to the control terminal of one of the silicon controlled rectifiers, and diodes connecting the junction of the pair of resistors to the anodes of the silicon controlled rectifiers to render said one silicon controlled rectifier conducting when energized by the potential source.

7. A circuit of the kind defined in claim 6 in which the utilization devices may be energized in forward and reverse order, each gating means comprising a pair of capacitors and a pair of diodes connected in bridge configuration and receiving pulses at a junction of the two diodes and transmitting the pulses from an opposite terminal to the control terminal of one of the silicon controlled rectifiers, first and second pairs of divider resistors connected to the anode of a forwardly sequentially adjacent silicon controlled rectifier and to the anode of a reversely sequentially adjacent silicon controlled rectifier, respectively, the resistors at their junctions being connected to two remaining terminals of the bridge, one pair of divider resistors being energized for controlling sequential conductance of the silicon controlled rectifiers in forward order and the other pair of divider resistors being energized for controlling sequential conductance of the silicon controlled rectifiers in reverse order.

8. A circuit for sequentially energizing in a forward or reverse order a number of utilization devices from a potential source, comprising a silicon controlled rectifier having a control terminal and having an anode and a cathode connected in series with each utilization device, capacitors connecting the anodes of the silicon controlled rectifier to one another to permit conduction by only one silicon controlled rectifier at a time, gating means connected to the silicon controlled rectifiers for sequentially applying energizing signals thereto, each gating means comprising a pair of capacitors and a pair of diodes connected in bridge configuration and receiving pulses at a junction of the two diodes and transmitting the pulses from an opposite terminal to the control terminal of an associated silicon controlled rectifier, first and second pairs of divider resistors connected to the anode of a forwardly sequentially adjacent silicon controlled rectifier and to the anode of a reversely sequentially adjacent silicon controlled rectifier, respectively, the resistors at their junction being connected to two remaining terminals of the bridge, one pair of divider resistors being energized for controlling sequential conductance of the silicon controlled rectifiers in forward order and the other pair of divider resistors being energized for controlling sequential conductance of the silicon controlled rectifiers in reverse order.

9. The combination comprising a silicon controlled rectifier having an anode, a cathode, and a control terminal, a source of electrical energy having its negative terminal connected to the cathode of the silicon controlled rectifier and having its positive terminal connected through a series connected first resistor and a diode to the anode of the silicon controlled rectifier and through said first resistor and a second resistor to the control terminal of the silicon controlled rectifier to render the silicon controlled rectifier conducting.

10. A circuit for sequentially energizing in a forward or reverse order a plurality of devices connected in parallel to a power source, comprising a silicon controlled rectifier connected in series with each of the devices to control energization of the associated device by the power source, gating means connected to the silicon controlled rectifier to provide for current flow through one silicon controlled rectifier and block current flow through the other silicon controlled rectifier, means for applying a source of forward steering potential to said gating means and means for applying a source of reverse steering potential to said gating means, and means for applying pulses to each of said gating means to energize the devices sequentially in forward or reverse order determined by energization of said gating means by the source of forward steering potential or the source of reverse steering potential.

References Cited by the Examiner
UNITED STATES PATENTS 2,980,839   4/1961   Haeussermann _____ 318—254 X
3,025,443   3/1962   Wilkenson et al. _____ 318—138
3,040,270   6/1962   Gutzwiller _____ 307—88.5
3,159,777   12/1964  Manteuffel _____ 318—138

OTHER REFERENCES

Publication II: GE SCR Manual, 2nd Ed. Auburn, N.Y., TK 2798, G4g, 1961, p. 98.

Publication: IBM Technical Disclosure Bulletin, vol. 3, No. 6, November 1960, pp. 44 and 45.

ORIS L. RADER, *Primary Examiner.*